US006985477B2

(12) United States Patent
Couture

(10) Patent No.: US 6,985,477 B2
(45) Date of Patent: Jan. 10, 2006

(54) METHOD AND APPARATUS FOR SUPPORTING MULTISERVICE DIGITAL SIGNAL PROCESSING APPLICATIONS

(75) Inventor: Louis Couture, Goleta, CA (US)

(73) Assignee: Cisco Technology, Inc., San Jose, CA (US)

( * ) Notice: Subject to any disclaimer, the term of this patent is extended or adjusted under 35 U.S.C. 154(b) by 83 days.

(21) Appl. No.: 09/049,288

(22) Filed: Mar. 26, 1998

(65) Prior Publication Data

US 2002/0110111 A1 Aug. 15, 2002

(51) Int. Cl.
*H04L 12/66* (2006.01)

(52) U.S. Cl. .................................. 370/352; 370/466
(58) Field of Classification Search ............... 370/467, 370/236, 552, 356, 400, 410, 466, 465, 469, 370/412; 455/428, 352, 422, 18; 709/200, 709/223, 224, 225, 226, 201, 246, 247, 221; 725/132, 152, 24, 39; 702/62
See application file for complete search history.

(56) References Cited

U.S. PATENT DOCUMENTS

| | | | |
|---|---|---|---|
| 3,889,054 A | | 6/1975 | Nagel et al. |
| 4,042,958 A | | 8/1977 | Saylor et al. |
| 4,054,911 A | | 10/1977 | Fletcher et al. |
| RE31,863 E | | 4/1985 | Saylor et al. |
| 5,003,591 A | * | 3/1991 | Kauffman et al. .......... 725/132 |
| 5,133,081 A | * | 7/1992 | Mayo .......................... 455/18 |
| 5,367,678 A | | 11/1994 | Lee et al. |
| 5,436,955 A | * | 7/1995 | Kaewell, Jr. et al. |
| 5,440,740 A | | 8/1995 | Chen et al. |
| 5,467,286 A | * | 11/1995 | Pyle et al. ..................... 702/62 |
| 5,479,407 A | * | 12/1995 | Ko et al. ..................... 370/236 |
| 5,497,373 A | | 3/1996 | Hulen et al. |
| 5,625,845 A | | 4/1997 | Allran et al. |
| 5,682,484 A | | 10/1997 | Lambrecht |
| 5,748,468 A | | 5/1998 | Notenboom et al. |
| 5,787,149 A | * | 7/1998 | Yousefi et al. .............. 455/422 |
| 5,841,991 A | * | 11/1998 | Russell ........................ 709/221 |
| 5,880,720 A | * | 3/1999 | Iwafune et al. ............... 725/24 |
| 5,982,783 A | * | 11/1999 | Frey et al. ................... 370/467 |
| 6,002,689 A | * | 12/1999 | Christie et al. ............. 370/410 |
| 6,026,086 A | * | 2/2000 | Lancelot et al. ............ 370/466 |
| 6,040,829 A | * | 3/2000 | Croy et al. .................. 455/352 |
| 6,052,145 A | * | 4/2000 | Macrae et al. .............. 725/152 |
| 6,104,721 A | | 8/2000 | Hsu |
| 6,122,232 A | * | 9/2000 | Schell et al. ............. 369/44.11 |
| 6,160,545 A | * | 12/2000 | Eyer et al. ..................... 725/39 |
| 6,161,008 A | * | 12/2000 | Lee et al. .................... 370/352 |
| 6,269,095 B1 | * | 7/2001 | Neubauer et al. ........... 370/352 |

FOREIGN PATENT DOCUMENTS

| | | |
|---|---|---|
| EP | 0 505 884 A3 | 3/1992 |
| EP | 0 505 884 A2 | 3/1992 |
| GB | 2 200 816 A | 1/1988 |
| WO | WO 94/16528 | 12/1993 |

OTHER PUBLICATIONS

IBM Technical Disclosure Bulletin, vol. 34, No. 7B Dec. 1991.

U.S. Appl. No. 09/049,288, Couture.

* cited by examiner

*Primary Examiner*—Duc Ho
*Assistant Examiner*—Phuongchau Ba Nguyen
(74) *Attorney, Agent, or Firm*—Blakely, Sokoloff, Taylor & Zafman LLP

(57) ABSTRACT

A system and method for making available on a dynamic basis a large library of different firmware processing algorithms to each DSP processor engine of a DSP processor array is disclosed. A master DSP engine continuously broadcasts firmware algorithms used in processing a number of types of data from an attached memory to service DSP engines over the channelized serial bus. The DSP array receives PCM data from multiplexed lines of a public switched telephone network and packetized data from an Internet Protocol (IP) network, then each service DSP engine determines a firmware algorithm required to process the type of data received. The service DSP engine processes the received data using that firmware algorithm.

130 Claims, 7 Drawing Sheets

METHOD AND APPARATUS FOR SUPPORTING MULTISERVICE DIGITAL SIGNAL PROCESSING APPLICATIONS

FIELD OF THE INVENTION

The present invention relates generally to a mechanism for supporting multiservice digital signal processing (DSP) applications and more particularly to the simultaneous processing of a number of data types on a host platform.

BACKGROUND OF THE INVENTION

Until recently there has persisted a fundamental dichotomy between two main types of telecommunication networks. The first type of telecommunication network, the telephone network, switches and transports predominantly voice, facsimile, and modulation-demodulation system (modem) traffic. The public switched telephone network (PSTN) is an example of this type of network. Telephone networks are also deployed privately within organizations such as corporations, banks, campuses, and government offices. The second type of telecommunication network, the data network, switches or routes and transports data between computers. The Internet is an example of a public data network; data networks may be privately deployed.

Telephone networks were developed and deployed earlier, followed by data networks. Telephone network infrastructures are ubiquitous, however, and as a result data networks typically are built, to a limited extent, using some components of telephone networks. For example, the end user access link to a data network in some cases is implemented with a dial-up telephone line. The dial-up telephone line thus connects the end user computer equipment to the data network access gateway. Also, high speed digital trunks interconnecting remote switches and routers of a data network are often leased from telephone long-haul carriers.

Nonetheless, telephone and data network infrastructures are usually deployed together with limited sharing of resources, especially with regards to the core components of the networks—the switches and routers that steer the payloads throughout the networks. The cost of this redundancy coupled with advances in data network technologies has led, where possible, to integrated telephony traffic comprising voice, facsimile, and modem information over a unified data network. As such, a data network dial-up access gateway should now be able to accept, service, and deliver any type of data over its access telephone links on a random, dynamic basis using a minimum set of hardware on a single platform.

In prior art multiservice processing applications involving the processing of multiple data types, a matrix of digital signal processors (DSP) are typically required to perform digital signal processing (DSP) operations on a number of channels of data. For modem and facsimile traffic, the DSPs are mostly used to modulate and demodulate the traffic to and from the dial-up telephone access links. For a voice call over the same link, the same DSP can instead be used to compress and decompress the voice traffic towards and from the core of the data network and to suppress undesirable echoes which usually arise at various points in the network.

Within the access gateway equipment, a host bus and host processor typically communicate payload data between the DSP processors of the array and the data network side of the DSP array. A number of serial links typically communicate payload data between the DSP processors of the array and the telephone dial-up side of the array. The payload data can be one of several types, and several processing routines, or algorithms, are typically required of each processor on a dynamic basis, where particular processing algorithms correspond to particular data types. Therefore, different algorithms which are resident as different software images are required to be loaded and run on each of the DSP processors of the processor matrix on a dynamic basis. The problems inherent in dynamically loading and running different software images depends upon the prior art implementation selected on a platform. In spite of the presence of a corresponding separate external memory with each DSP of the processor array, it is prohibitive for this multiply instantiated memory to be large enough to hold all the possible software modules necessary to process all data types.

One prior art DSP platform holds resident in a large memory of a host processor all algorithms necessary to process all data types serviced by the access gateway. Data received into this DSP platform is provided to a DSP processor of the array. The DSP processor identifies the received data type and makes a request over to a host processor for the necessary processing software routine. The host processor responds by downloading the requested software routine to the DSP processor over the host bus.

The problem with this prior art implementation is that the host processor and its associated bus are already heavily tasked in moving payload data into and out of the DSP processor array. Peak saturating bandwidths occur when many software download requests are responded to simultaneously. A typical example shows that bus bandwidth saturation is reached when the host processor services requests from five or more DSP processors simultaneously. Therefore, the presence of 24 or 30 DSP processors in a multiservice access gateway servicing a T1 or E1 data line, respectively, would saturate the host bus and host processor. The occurrence of peak saturating bandwidths results in an overall reduction in service reliability by the access gateway. Therefore, this prior art system is not upwardly scalable to include many DSP processors in the DSP processor array without a significant decrease in service reliability. Furthermore, an adverse impact on the perceived quality of the delivered voice traffic would result.

Another prior art DSP platform uses larger shared memory systems among the members of small DSP processor groupings. Data received into this DSP platform is provided to a DSP processor of the array. The DSP processor identifies the received data type and accesses the shared memory system of its grouping for the necessary processing software routine.

The problem with this prior art implementation is that a large memory system would have to be instantiated several times on the hardware platform because the number of processors sharing a software library would typically be required to be kept small for performance reasons. The performance of the individual array processors is not reliable because the individual processing members of the array may periodically have to cease processing when accesses to the shared memory system are delayed because the memory system is responding to requests from other processors. Therefore, this implementation is inefficient with regard to cost, space, and performance.

An alternate prior art DSP platform holds resident in the private memory of each DSP processor of the array all of the required processing algorithms. Data received into this DSP platform is provided to a DSP processor of the array. The DSP processor identifies the received data type and processes the data using a software routine stored in its associated memory.

The problem with this prior art implementation is that it requires significant duplication of memory assets. This results in a higher cost and the consumption of a significant amount of space in the hardware platform.

SUMMARY AND OBJECTS OF THE INVENTION

It is therefore an object of the invention to make available on a dynamic basis a large library of different firmware processing algorithms to each DSP processor engine of a DSP processor array.

It is a further object of the invention to efficiently perform digital signal processing of multiple types of data, using multiple firmware algorithms resident on a host platform, in order to communicate data over an Internet Protocol (IP) network and a public switched telephone network (PSTN).

It is a further object of the invention to increase the digital signal processing density when processing multiple types of data, using multiple firmware algorithms resident on a host platform, in order to communicate data over an Internet Protocol (IP) network and a PSTN.

It is a further object of the invention to reduce the memory, and corresponding platform area and space, required for performing digital signal processing of multiple types of data, using multiple firmware algorithms resident on a host platform, in order to communicate data over an Internet Protocol (IP) network and a PSTN.

It is a further object of the invention to reduce the cost per channel of digital signal processing when communicating multiple data types over an Internet Protocol (IP) network and a public switched telephone network (PSTN).

These and other objects of the invention are provided by a continuous broadcast of a number of firmware algorithms from a master DSP engine resident in a host processor to a number of service DSP engines of a DSP array over a channelized serial bus. The firmware algorithms are resident in a memory controlled by the master DSP engine.

In one embodiment, each service DSP engine is coupled to receive PCM data from multiplexed lines of a public switched telephone network and packetized data from an Internet Protocol (IP) network. The data may include, but is not limited to, modem data, voice data, audio data, video data, and facsimile data. The data is provided to one of a number of service DSP engines of a DSP array. Upon receipt of the data, each service DSP engine determines a data type of the received data and determines a firmware algorithm required to process the data. The service DSP engine then determines an address of at least one channel of the channelized serial bus on which the required firmware algorithm is available and unmasks a corresponding bit of an interrupt mask in the service DSP engine. In response to the receipt of an interrupt signal corresponding to the unmasked interrupt bit, the service DSP engine executes an interrupt service routine resulting in the receipt and storage of the corresponding firmware algorithm from the master DSP engine. The interrupt is asserted by the firmware broadcast DSP just before block boundaries of the played-out firmware and is used by the receiving DSPs to synchronize the code upload to the code playout. The service DSP engine processes the received data using the received firmware algorithm. When the data received by the service DSP engine is PCM data received from the PSTN, the service DSP engine produces packetized data for communication over the IP network. When the data received by the service DSP engine is packetized data received from the IP network, the service DSP engine produces PCM data for communication over the PSTN.

Other objects, features, and advantages of the present invention will be apparent from the accompanying drawings and from the detailed description which follows below.

BRIEF DESCRIPTION OF THE DRAWINGS

The present invention is illustrated by way of example and not limitation in the figures of the accompanying drawings, in which like references indicate similar elements, and in which.

DETAILED DESCRIPTION

A multiservice processing system is provided wherein a continuous broadcast of a number of firmware algorithms from a master DSP engine to a number of service DSP engines using a channelized serial bus is provided. The firmware algorithms are resident in a shared memory controlled by the master DSP engine. The multiservice processing array provided herein provides, on a dynamic and continuous basis, a large library of different firmware processing algorithms to each DSP processor engine of a DSP processor array. The limited private external memory of each service DSP engine is dynamically overwritten with the relevant firmware module depending on the incident data call type. This multiservice processing array efficiently performs simultaneous digital signal processing of multiple types of data, using multiple firmware algorithms resident on a host platform, in support of packetized data communication over an Internet Protocol (IP) network and PCM data communication over a public switched telephone network (PSTN), thereby reducing the time and memory required for performing the processing. Therefore, the continuous firmware delivery system allows service DSP engines to dynamically reload with the appropriate algorithm or firmware overlay or subsystem software to service a random incident telephony call types. These call types may comprise video, modem, facsimile, and voice data encoded using various protocols.

Figure 1:
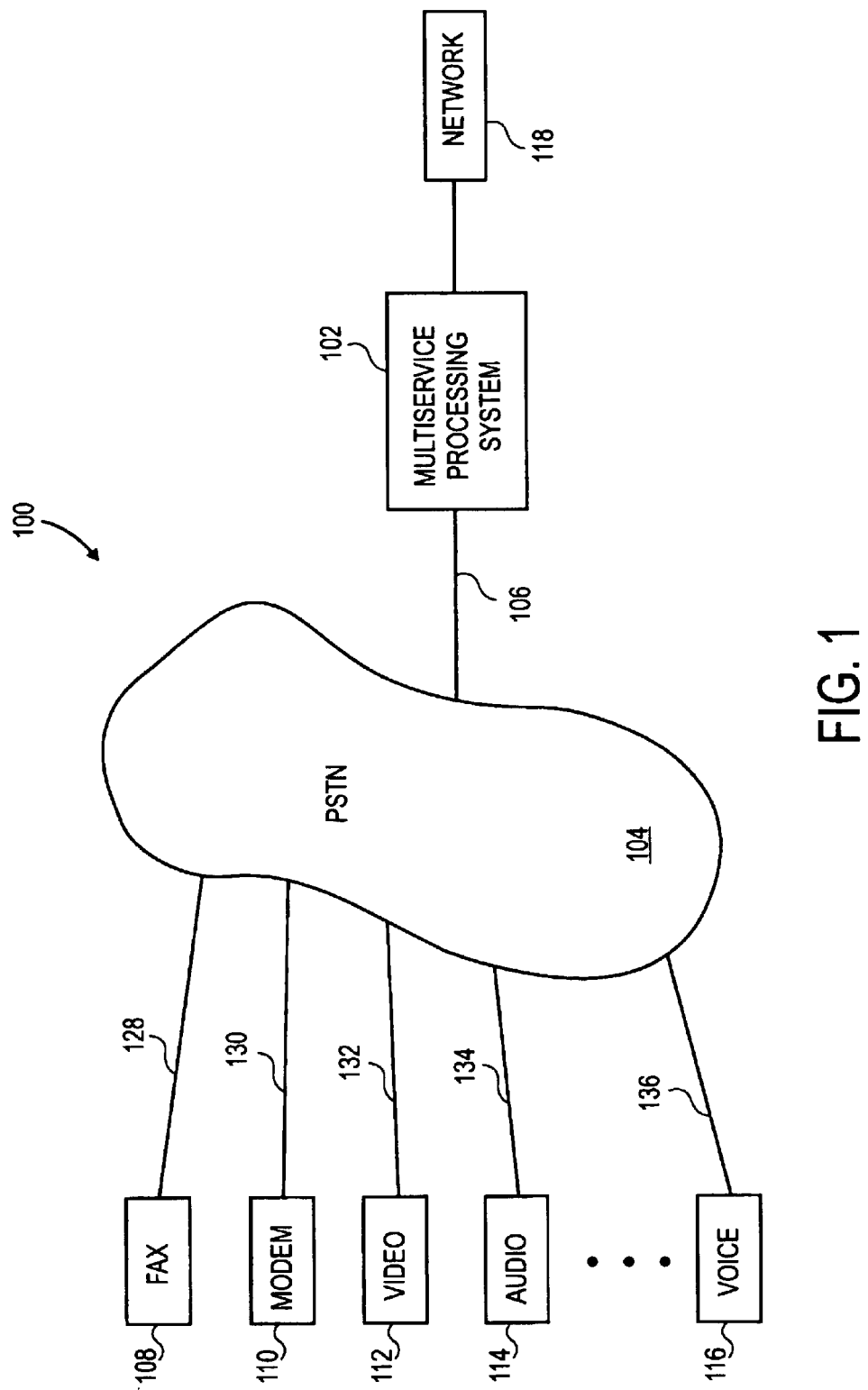
FIG. 1 is a communications system comprising the multiservice processing system of one embodiment.

FIG. 1 is a communications system 100 comprising the multiservice processing system 102 of one embodiment. The multiservice processing system 102 receives data from a PSTN 104 over a multiplexed line 106. The data is received as pulse coded modulation (PCM) data streams, but the embodiment is not so limited. In one embodiment, the multiplexed line 106 comprises 24 multiplexed data lines, but the embodiment is not so limited. The multiplexed line 106 may be a T1 data line, a T3 data line, or an E1 data line, but the embodiment is not so limited. The data types 108–116 received over the PSTN 104 comprise, but are not limited to, facsimile data 108, modem data 110, video data 112, audio data 114, and voice data 116, for example telephone data. The lines 128–136 over which the data 108–116, respectively, is provided may be multiplexed data lines, but the embodiment is not so limited. The multiservice processing system 102 processes the received PCM data and generates packets or cells comprising the processed data. The packets or cells are provided to an IP network 118 for transmission.

The multiservice processing system 102 also receives packetized data from the IP network 118. The data types received in packets or cells over the IP network 118 comprise, but are not limited to, facsimile data, modem data, video data, audio data, and voice data, for example telephone data. The multiservice processing system 100 unpacks the packetized data and generates PCM data streams comprising the data. The PCM data streams are provided to the PSTN 104 using the multiplexed line 106. The PSTN 104 distributes the PCM data streams to individual subscribers 108–116 of particular destinations using data lines 128–136. The data lines 128–136 may be multiplexed data lines, but the embodiment is not so limited.

Figure 2:
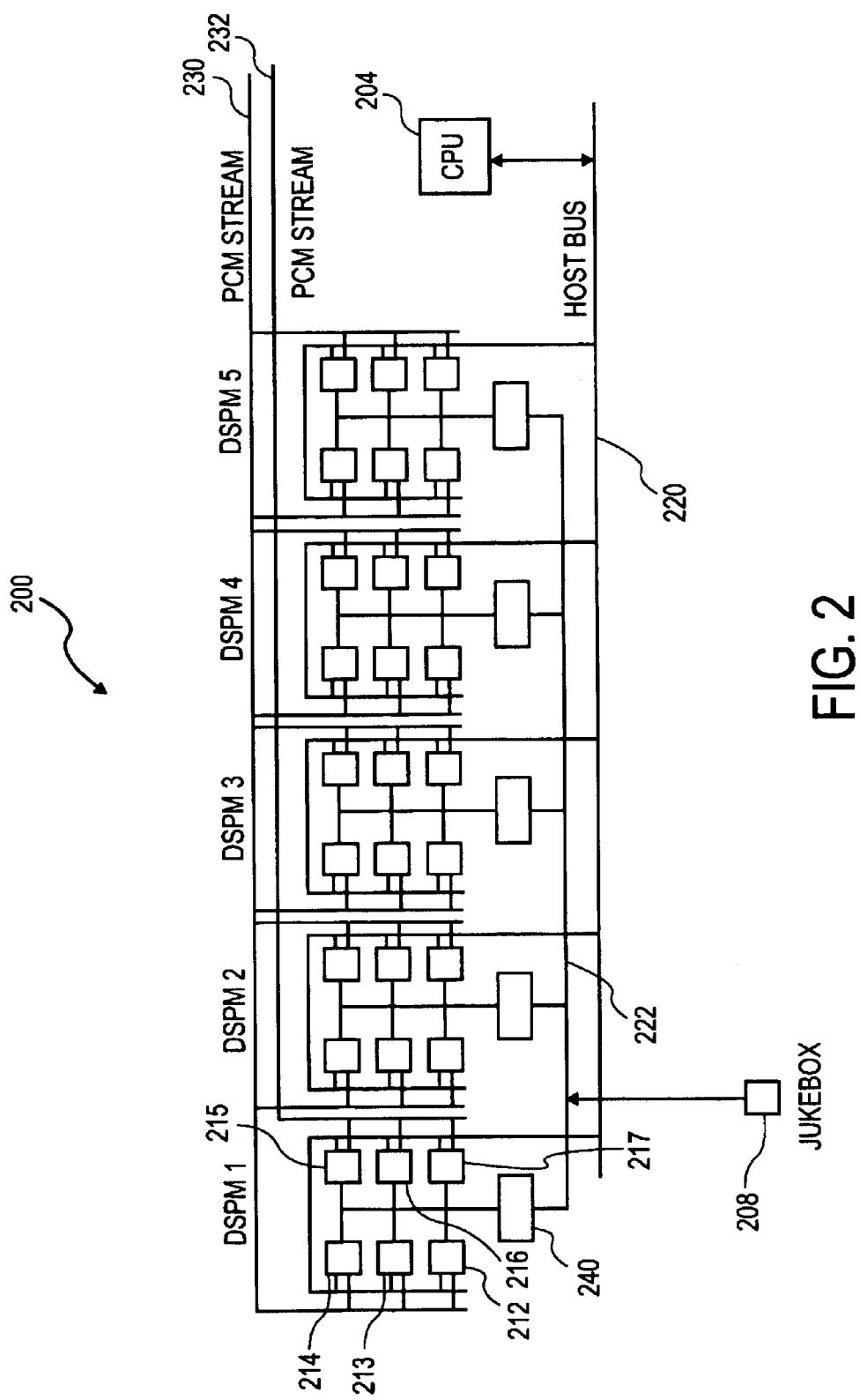
FIG. 2 is a multiservice processing system of one embodiment.
Figure 3:
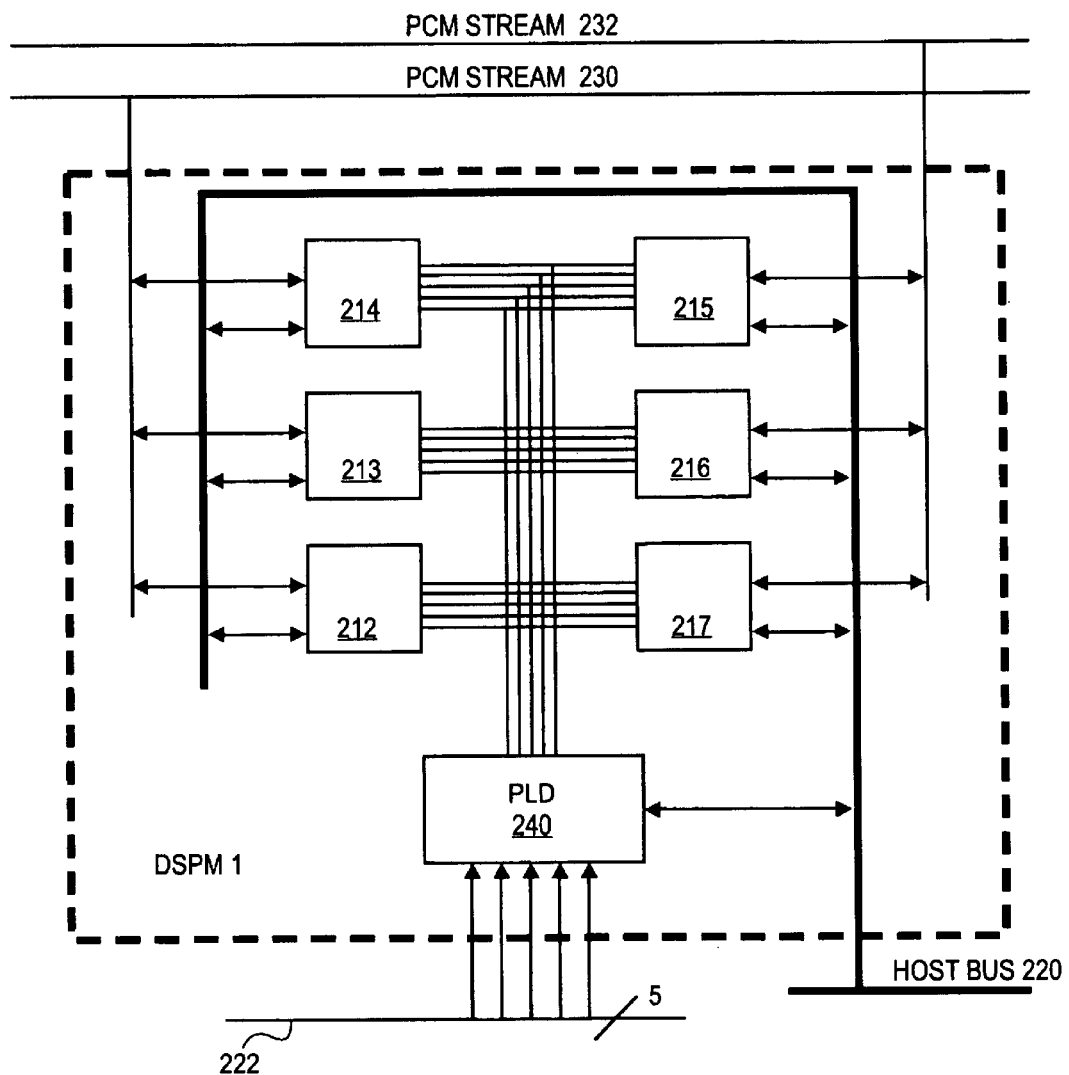
FIG. 3 is a DSP module of one embodiment.

FIG. 2 is a multiservice processing system 200 of one embodiment. The multiservice processing system 200 comprises a DSP array or matrix comprising five DSP modules (DSPMs) DSPM 1–5, but the embodiment is not so limited. FIG. 3 is a DSP module DSPM 1 of one embodiment. Each DSP module comprises six service DSP engines 212–217 divided into two groups wherein a first group comprises service DSP engines 212–214 and a second group comprises service DSP engines 215–217.

The multiservice processing system 200 supports the flow of data from the PSTN to the IP network and the flow of data from the IP network to the PSTN using PCM stream lines 230 and 232 and a host bus 220 coupled to a central processor unit (CPU) 204. To support data flow from the PSTN to the IP network, PCM data is received from the PSTN and provided to the service DSP engines using the PCM stream lines 230 and 232. A Time Division Multiplexed (TDM) interface (not shown) receives data from the PSTN over a multiplexed line, but the embodiment is not so limited. The PSTN data is processed and packetized by the service DSP engines 212–217, and the packetized data is provided to the IP network by the CPU 204 using the host bus 220 and a parallel memory mapped interface (not shown).

In supporting the flow of data from the IP network to the PSTN, packetized data is received from the IP network and provided to the service DSP engines 212–217 by the CPU 204 using the host bus 220 and a parallel memory mapped interface (not shown). The packetized data is unpacked and processed by the service DSP engines 212–217 to form PCM data streams. The PCM data is provided to the PSTN over the PCM stream lines 230 and 232.

In one embodiment, each DSP module comprises a programmable logic device (PLD) 240 that couples a TDM serial port of each service DSP engine 212–217 to a channelized serial bus 222. The TDM serial port of the master DSP engine 208, or jukebox DSP, is coupled to each of the service DSP engines 212–217 of the DSP array using the PLD 240 of each DSP module and the channelized serial bus 222. A firmware server interface provides a path from the master DSP engine acting as a firmware image broadcast server on the carrier to all service DSP engines on the multiple DSPMs. The interface couples the TDM serial port of the master DSP engine to the TDM serial port of all service DSP engines. The host processor 204 may comprise the master DSP engine, but the embodiment is not so limited.

The channelized serial bus 222 supports unidirectional communications from the master DSP engine 208 to each of the service DSP engines 212–217. In one embodiment, the channelized serial bus 222 comprises five lines, four lines of which provide eight channels over which firmware algorithms are continuously broadcasted to the service DSP engines 212–217, but the embodiment is not so limited. The fifth line of the channelized serial bus 222 comprises an interrupt line that is coupled between the master DSP engine 208 and an interrupt pin of each service DSP engine 212–217. This interrupt line communicates a serial interrupt signal that signals the service DSP engines 212–217 that a particular block of memory, or portion of a firmware algorithm, is about to be played out. As a different interrupt signal pulse and identifier precedes each firmware algorithm block, the service DSP engines 212–217 know when the particular firmware algorithms are going to be provided, and therefore, when to upload code from the channelized serial bus 222.

The firmware algorithms allow the service DSP engines 212–217 to act as the gateway between the PSTN and IP network domains. This gateway function, however, goes beyond the transparent transfer of data in that the various types of PSTN payloads are typically processed to achieve greater quality or save bandwidth on the packet domain. Echo cancellation, parametric and non-parametric voice coding, suppression of packet bandwidth utilization during voice silence, facsimile relay, and modem relay, are a few examples of the processing provided by the firmware algorithms, but the embodiment is not so limited.

Figure 4:
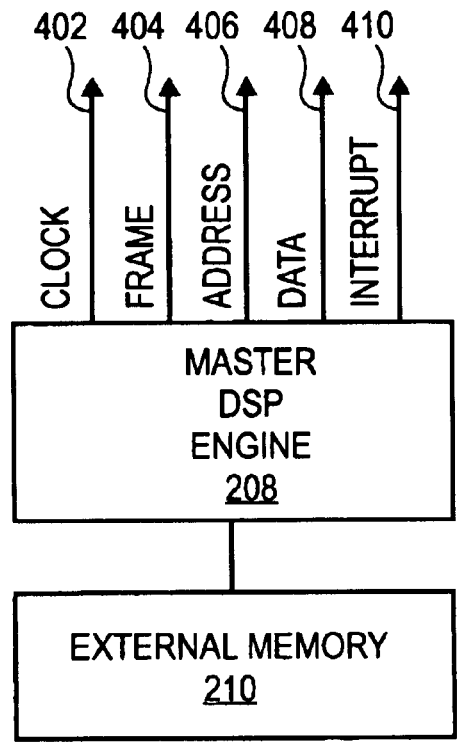
FIG. 4 is a master DSP engine and associated memory of one embodiment.

FIG. 4 is a master DSP engine 208 and associated memory 210 of one embodiment. The master DSP engine 208 may reside in the host CPU, but the embodiment is not so limited. The master DSP engine is coupled to an external memory. The external memory comprises a number of firmware algorithms that are used to process the data received by the multiservice processing system. The master DSP engine, as discussed herein, provides continuous and repetitive broadcasts of these firmware algorithms over the channelized serial bus.

The master DSP engine 208 provides five output signals 402–410 comprising a clock signal 402, a frame signal 404, an address signal 406, a data signal 408, and an interrupt signal 410, but the embodiment is not so limited. The frame signal identifies the boundary of each frame of eight 16-bit words. The clock signal is the synchronous reference to which the data, frame, and address signals are latched in and out of the DSP engines. The data signal carries the actual binary levels of the payload stream, the algorithm program code.

The address signal is an 8-bit serial encoded address word that is used to identify the channel number. In one embodiment, the position of a "1" bit in the binary address will be synchronized with the channel number. Thus, during the first timeslot the binary address will be "00000001"; during the second timeslot the binary address will be "00000010"; during the third timeslot the binary address will be "00000100"; during the fourth timeslot the binary address will be "00001000"; during the fifth timeslot the binary address will be "00010000"; during the sixth timeslot the binary address will be "00100000"; during the seventh timeslot the binary address will be "01000000"; and, during the eighth timeslot the binary address will be "10000000". Using this technique the service DSP engines use the address signal as the channel identifier and are capable of configuring their TDM ports to perform receive fetches on one or more specified channels.

Figure 5:
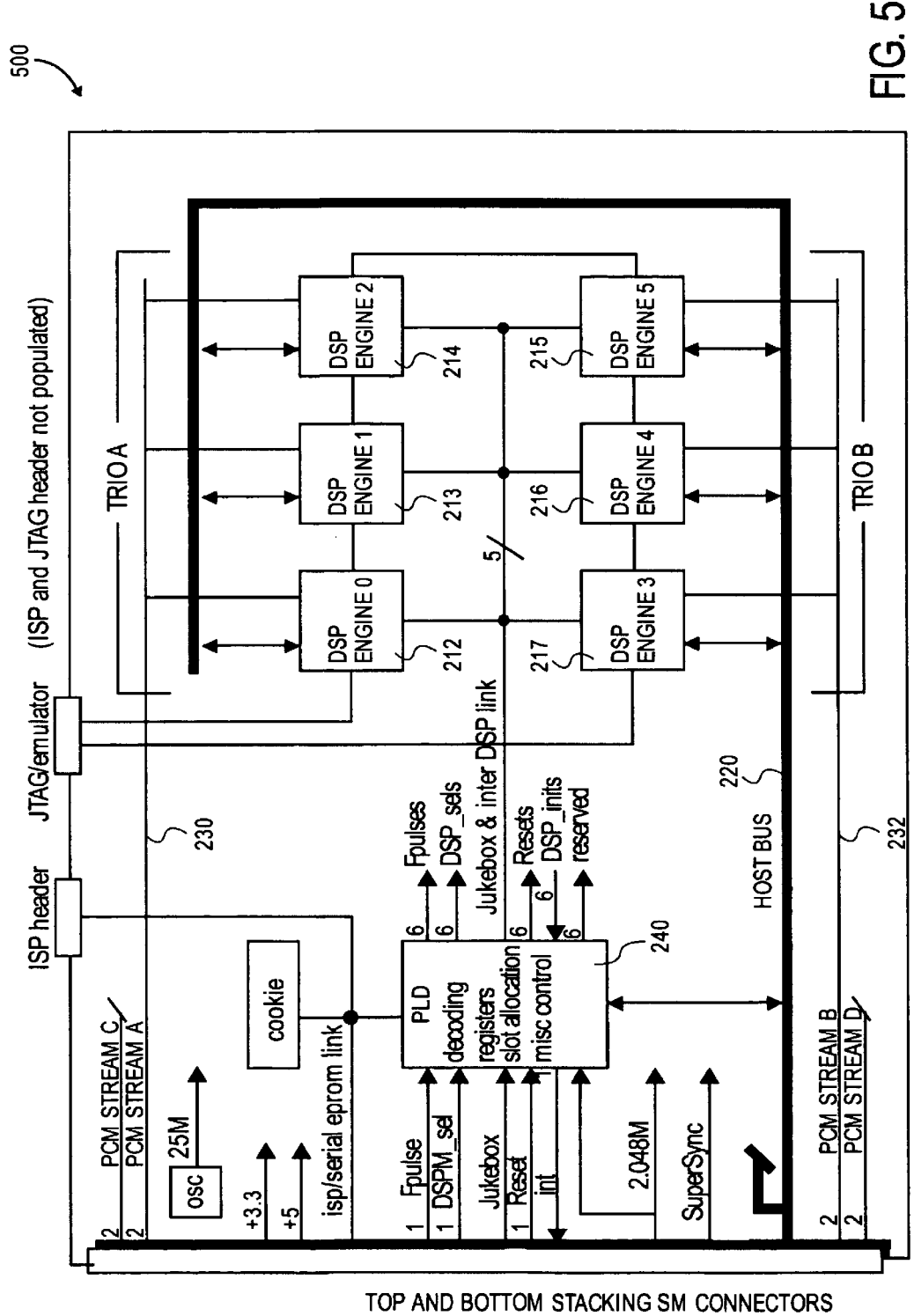
FIG. 5 is a hardware block diagram of a DSP module of one embodiment.

FIG. 5 is a hardware block diagram of a DSP module 500 of one embodiment. This DSPM 500 comprises six service DSP engines 212–217, each consisting of a Texas Instruments TMS320LC542-50 DSP and two banks of 64K×16 static random access memory (SRAM) having 128K words total, but the embodiment is not so limited. In one embodiment, a 50 million instruction per second (mips) DSP engine will process one or two data channels comprising voice and facsimile and modem channels, but the embodiment is not so limited. As discussed herein, communication to the host processor is provided through a host bus interface that links the host ports of the service DSP engines 212–217 to the host bus with the assistance of a PLD 240. Control messaging and payload packets are moved through this interface, but the embodiment is not so limited.

In one embodiment, the host bus interface is a 16-bit parallel asynchronous interface used to access the host ports of the six service DSP engines and the control registers in the PLD. The DSPM is addressed as a data byte wide device via a dedicated select line and six address lines. Furthermore, the DSPM electrical interface provides for 16 bits of data connection and 19 bits of address line connectors. The DSPM electrical interface also provides two select lines. One select line provides the actual select signal while the second select line allows stacking of DSPMs. The second select line represents a path to the select line of the stacked DSPM.

The DSPM interface is designed to connect up to four 2 MBps of bidirectional TDM streams using a TDM interface. The TDM interface connects to the buffered serial ports of the service DSP engines. The DSPM of one embodiment ports a multiframe synchronization signal for each of these four streams; the DSPM terminates two of these streams and is wired to support two multiframe synchronization signals.

An interrupt status register allows the host CPU to view the sources of interrupts coming from the DSPM. Interrupting sources may be polled through this register even if masked through an interrupt mask register. A logic "1" indicates that the source, the host interrupt line of the particular service DSP engine, is interrupting the host CPU. The interrupt mask register allows the host to mask the sources of interrupt coming from the DSPM. A logic "0" written to the corresponding bit will mask the given service DSP engine's host interrupt line. An unmasked interrupting source will result in the DSPM interrupt line going to the host CPU being asserted low until masked or cleared at the source, the particular service DSP engine.

In receiving PSTN data for communication over an IP network, data is received by the multiservice processing system from the PSTN comprising data sampled at 8,000 samples per second where each sample comprises 8 bits. This PSTN data is selectively provided to the service DSP engines of the DSP array over the PCM stream lines, as discussed herein. Upon receipt of the data, each service DSP engine determines the data type of the received data. Furthermore, each service DSP engine determines a firmware algorithm required to process the received data. The service DSP engine then selectively monitors the channelized serial bus for at least one firmware algorithm, wherein the firmware algorithm is used to process the received data. When the firmware algorithm monitored for is detected on the channelized serial bus, the service DSP engine receives the firmware algorithm.

The selective monitoring performed by the service DSP engine comprises the service DSP engine determining an address of at least one channel of the channelized serial bus on which the required firmware algorithm is available. In one embodiment, the serial bus comprises eight channels, but the embodiment is not so limited. Upon determination of the channel address, the service DSP engine unmasks a bit of an interrupt mask in the service DSP engine, where the unmasked bit corresponds to the address of at least one channel of the serial bus on which the firmware algorithm is transmitted.

In response to the receipt of an interrupt signal corresponding to the unmasked interrupt bit, the service DSP engine executes an interrupt service routine. The interrupt service routine causes the corresponding firmware algorithm to be received by the service DSP engine. Furthermore, the interrupt service routine causes the received firmware algorithm to be stored in the SRAM of the corresponding service DSP engine. The service DSP engine uses the stored firmware algorithm to process the PSTN data received by the service DSP engine thereby packetizing the data received from the PSTN. The service DSP engine loads the packetized data into a buffer of the service DSP memory. The CPU monitors the status of the buffer via the host bus. When packetized data is detected in the buffer, the data is downloaded over the host bus to router circuitry. The router circuitry provides the packetized data to the Internet Protocol (IP) network.

In the case where a data stream changes from one data type to another data type mid-stream, for example, where a telephone call transmits voice data and facsimile data, the service DSP engine processing that call will recognize any changes in data type and, in response, selectively monitor for and receive a firmware algorithm to use in processing the new data type. A call type can be signaled to the service DSP engines by the host CPU at call onset and it can change between start and finish such as, for example, a voice call changing to facsimile data. The service DSP engines are able to take configuration instructions from the host CPU and are able to detect the call types as well. In the case of a voice call changing to facsimile, the DSP is able to detect the transition, load the appropriate firmware module, and start execution within a nominal time.

In processing data received from an IP network for communication over a PSTN, packetized data is received from the IP network and selectively provided to the service DSP engines of the DSP array over the host bus using the CPU, as discussed herein. Upon receipt of the data, each service DSP extracts the data from the packet or cell used for transmission over the IP network. The service DSP then determines the data type of the received data. Furthermore, each service DSP engine determines a firmware algorithm required to process the received data. The service DSP engine then selectively monitors the channelized serial bus for at least one firmware algorithm, wherein the firmware algorithm is used to process the received data. When the firmware algorithm monitored for is detected on the channelized serial bus, the service DSP engine receives the firmware algorithm.

The selective monitoring performed by the service DSP engine comprises the service DSP engine determining an address of at least one channel of the channelized serial bus on which the required firmware algorithm is available. In one embodiment, the serial bus comprises eight channels, but the embodiment is not so limited. Upon determination of the channel address, the service DSP engine unmasks a bit of an interrupt mask in the service DSP engine, where the unmasked bit corresponds to the address of at least one channel of the serial bus on which the firmware algorithm is transmitted.

In response to the receipt of an interrupt signal corresponding to the unmasked interrupt bit, the service DSP engine executes an interrupt service routine. The interrupt service routine causes the corresponding firmware algorithm to be received by the service DSP engine. Furthermore, the interrupt service routine causes the received firmware algorithm to be stored in the SRAM of the corresponding service DSP engine. The service DSP engine uses the stored firmware algorithm to process the data received by the service DSP engine thereby generating PCM streams for communication to subscribers over the PSTN. The service DSP engine communicates the PCM streams over the PCM lines of the multiservice processing system to the multiplexed lines of the PSTN.

Figure 6:
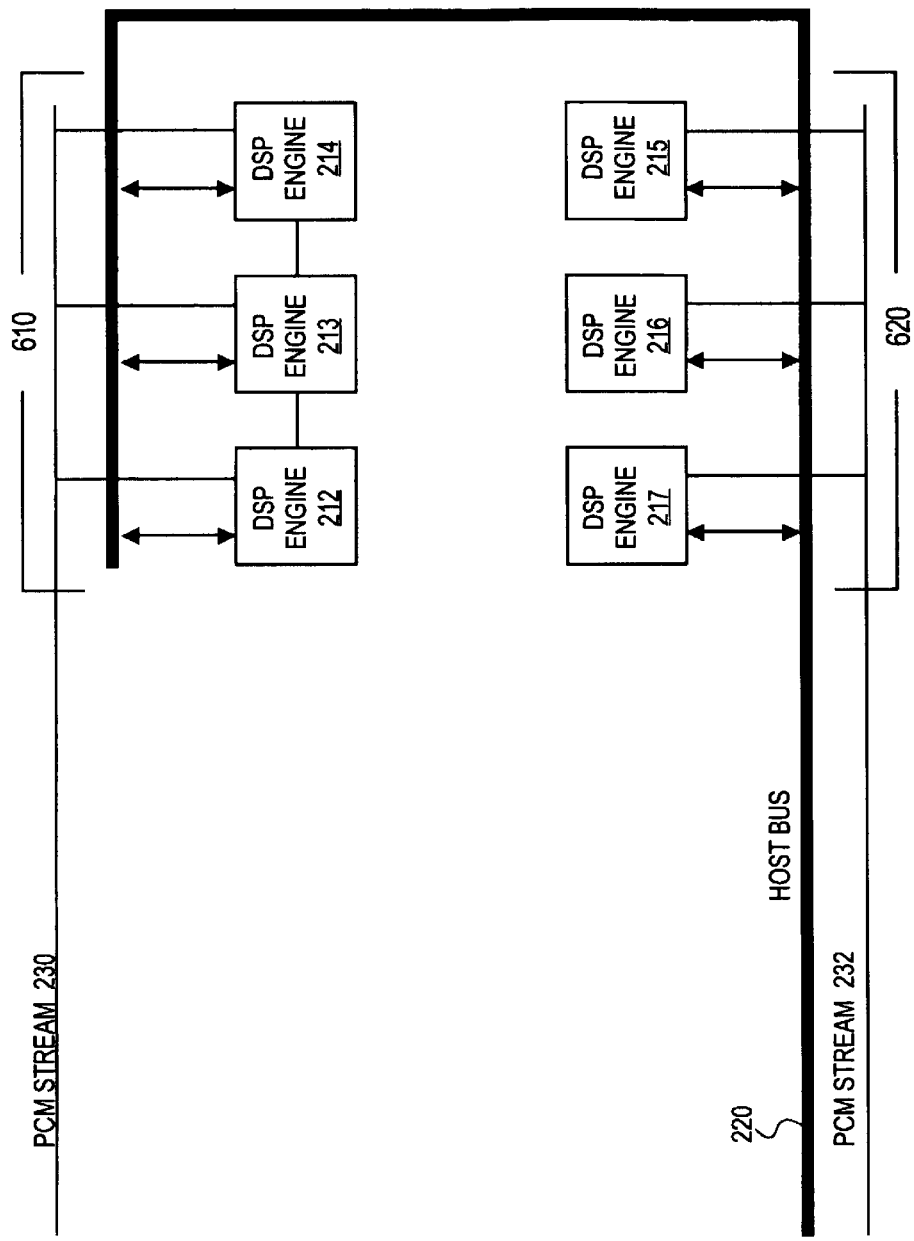
FIG. 6 is a data flow diagram of a DSP module of one embodiment.

FIG. 6 is a data flow diagram of a DSP module of one embodiment. The service DSP engines 212–217 of the DSP module are divided into two groups 610 and 620 with group 610 comprising service DSP engines 212–214 and group 620 comprising service DSP engines 215–217. This data flow scheme supports the flow of data from the PSTN to the IP network and the flow of data from the IP network to the PSTN. To support data flow from the PSTN to the IP network, PCM data is received from the PSTN and provided to the service DSP engines 212–217 using the PCM stream lines 230 and 232. The PSTN data is processed and packetized by the service DSP engines 212–217, and the packetized data is provided to the IP network over the host bus 220 using a parallel memory mapped interface. To support data flow from the IP network to the PSTN, packetized data is received from the IP network and provided to the service DSP engines 212–217 using the host bus 220 and the parallel memory mapped interface. The packetized data is unpacked and processed by the service DSP engines 212–217 to produce PCM streams. The PCM streams comprising the PCM data are provided to the PSTN over the PCM stream lines 230 and 232.

Figure 7:
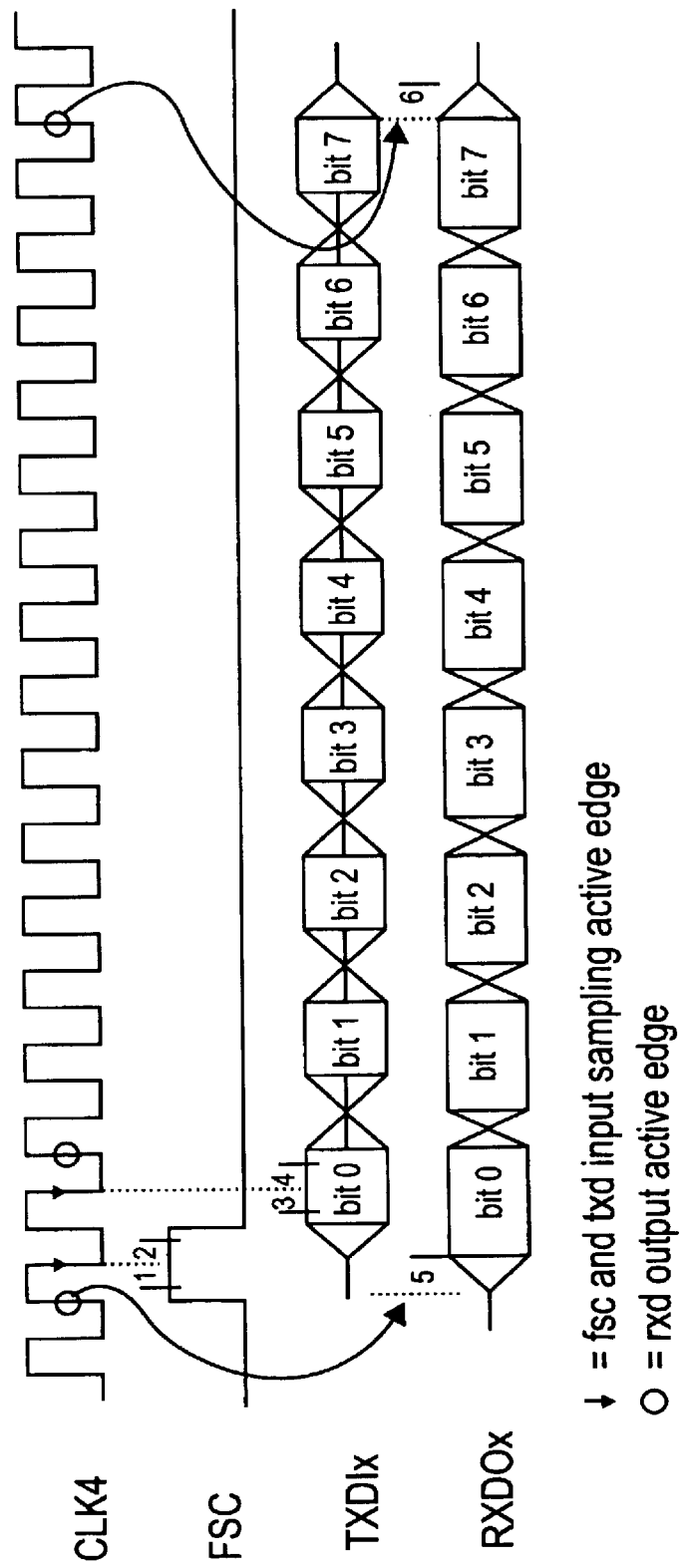
FIG. 7 is the TDM interface timing for a first timeslot.

As discussed herein, the data flow scheme supporting data flow between the PSTN and the DSP module involves PCM formatted data flowing between the PSTN domain and the service DSP engine domain in PCM streams. The PCM streams are interfaced to the service DSP engines 212–217 through a buffered serial port. The PCM stream 230 carries PCM data to and from service DSP engines 212–214 for processing, while the PCM stream 232 carries PCM data to and from service DSP engines 215–217 for processing. Each of the PCM streams 230 and 232 comprise 32 channels per frame provided over a set of bidirectional communication lines; FIG. 7 is the TDM interface timing for the first timeslot of the 32 timeslots. The ingress lines of PCM stream 230 and 232 provide PSTN data to the service DSP engines 212–214 and 215–217, respectively, for processing in order to packetize the PSTN data for communication over an IP network. The egress lines of PCM stream 230 and 232 provide PCM data to the PSTN from service DSP engines 212–214 and 215–217, respectively, for communication to PSTN subscribers. The egress lines of PCM stream 230 and 232 provide a private frame pulse for each service DSP engine, but the embodiment is not so limited.

As further discussed herein, the data flow scheme supporting data flow between the IP network and the DSP module involves packetized data flowing between the IP network domain and the service DSP engine domain in packets or cells. The host bus, in supporting two-way communications, carries packetized data to and from service DSP engines 212–217 for processing. Consequently, the host bus provides packetized data to the service DSP engines 212–217 from the IP network for processing in order to generate PCM data for communication over the PSTN. The host bus also provides PSTN data that has been packetized from the service DSP engines 212–217 to the IP network for communication.

As previously discussed for one embodiment, the continuous serial firmware broadcast system is implemented by designing onto the carrier card an extra DSP comprising a private memory large enough to store all the firmware modules required to process all of the data types processed by the multiservice processing system. This extra DSP, the jukebox DSP or master DSP engine, broadcasts firmware blocks continuously and repetitively out of a TDM serial port over the channelized serial bus to the TDM serial ports of all service DSP engines of the DSP array. Therefore, all DSP engines of the multiservice processing system are bussed together using the serial bus. As only the master DSP engine transmits on this bus, the service DSP engines receive communications from the master DSP engine, but the embodiment is not so limited. The service DSP engines, therefore, selectively receive particular firmware modules from the repetitive broadcast stream that are needed to process received data and ignore the broadcast of all other firmware modules. It is noted that the TDM serial ports of the DSP engines may be different from the buffered serial port through which PCM streams are interfaced to the service DSP engines, but the embodiment is not so limited.

Furthermore, it is noted that it is possible to use the TDM serial port inter-DSP communication facility among the six service DSP engines on any DSPM in a conventional way. This is done by isolating, using CPU control, the TDM port signal bus of the DSPM from its external source at the PLD; a bit in a Miscellaneous Control Register of the DSPM PLD controls this feature. When isolated from the master DSP engine signals, all service DSP engines within that particular DSPM can transmit on the inter-DSP communication link to other service DSP engines within that DSPM.

The firmware algorithms are sectioned and delivered to the service DSP engines using small fixed size blocks so that a service DSP engine in need of a module will not have to wait for the playout of that particular algorithm to begin again after just missing the beginning of the playout. As such, the beginning words of each block comprise a code that identifies that particular block. A service DSP engine monitoring the broadcast for a particular algorithm evaluates these identifier words in order to decide if a given block contains a portion of all of the algorithm for which the service DSP engine is monitoring. This technique allows acceptance of an algorithm to begin at multiple points during any given module playout as opposed to beginning only at the beginning of a module. Thus, this technique reduces the worst-case delivery time by nearly fifty percent.

The beginning blocks are signified to the service DSP engines by a broadcasted interrupt signal from the master DSP engine. The interrupt signal notifies the service DSP engines that the time frame pulse will correspond to the beginning of the first word of a new block. As this signal is connected to an interrupt input pin on each service DSP engine, a service DSP engine can mask the corresponding interrupt to ignore the broadcast or it can unmask the corresponding interrupt at the time it begins monitoring for a particular algorithm.

An interrupt service routine associated with a particular interrupt reads the next word received into the TDM port, the first word of the block, and call the appropriate software routine to load the remainder of the block, if appropriate. If the identified block is not the block for which the service DSP has been monitoring, the software routine will simply re-enable the interrupt so that the following block can also be identified. This process will repeat until all blocks of a module have been loaded, at which time the interrupt is remasked.

In one embodiment, a service DSP engine in need of a firmware algorithm module can be signaled by the CPU, using the host port communication, on which channel to find the module. This technique may be used in the case of CPU-initiated firmware configurations. Furthermore, in the case of service DSP engine-detected configuration requirements, the service DSP engine can use hard-coded information comprising the channel number of a particular firmware module.

The various firmware algorithms have different delivery time requirements that can be accommodated by using different delivery bandwidth allocations on the channelized serial link. For example, the facsimile relay algorithm, with the most critical delivery time requirement, is allocated one or more channels while algorithms with less critical delivery time requirements can be grouped together on a single channel. This allocation is achieved by appropriate distribution of the eight TDM channels of the TDM port interface among the different algorithms.

The invention has been described in conjunction with the preferred embodiment. Although the present invention has been described with reference to specific exemplary embodiments, it will be evident that various modifications and changes may be made to these embodiments without departing from the broader spirit and scope of the invention as set forth in the claims. Accordingly, the specification and drawings are to be regarded in an illustrative rather than a restrictive sense.

What is claimed is:

1. A method for supporting digital signal processing (DSP) of a plurality of data types, the method comprising:
    continuously broadcasting a plurality of algorithms embodied as software routines toward a plurality of DSPs;
    selectively monitoring for and receiving software routines for at least one algorithm of the plurality of algorithms in response to a determination of a type of data that one of the plurality of DSPs is to process; and,
    processing data with the selectively monitored for and received software routines and the one DSP by executing at least a portion of the selectively monitored for and received software routines upon the one DSP, the data being of the type of data, the processing to process the data as it travels between networks.

2. The method of claim 1, further comprising:
    receiving at least one pulse coded modulation (PCM) data stream from a public switched telephone network (PSTN);
    generating at least one packet of data from the PCM data stream with the software and the one DSP; and,
    transmitting the at least one packet of data over an Internet Protocol (IP) network, the PSTN being a first of the networks, the IP network being a second of the networks.

3. The method of claim 1, further comprising:
    receiving at least one packet of data from an IP network;
    generating at least one PCM data stream from the at least one packet of data with the software routines for the at least one algorithm and the DSP; and,
    transmitting the at least one PCM data stream over a PSTN, the PSTN being a first of the networks, the IP network being a second of the networks.

4. The method of claim 1, wherein the data is part of a bidirectional PCM data stream.

5. The method of claim 1, wherein the data is passed over a bidirectional host bus.

6. The method of claim 1, wherein the plurality of algorithms are continuously broadcasted toward the plurality of DSPs by a master DSP engine that is implemented with a processor.

7. The method of claim 6, wherein the plurality of algorithms are continuously broadcasted toward the plurality of DSPs over a channelized serial bus.

8. The method of claim 7, wherein the selectively monitoring for and receiving of the software routines for the at least one algorithm comprises determining an address of at least one channel of the serial bus on which the software routines for the at least one algorithm is available.

9. The method of claim 8, wherein the selectively monitoring for and receiving of the software routines for the at least one algorithm further comprises unmasking a bit of an interrupt mask, the unmasked bit corresponding to the address of at least one channel of the serial bus on which the software routines for the at least one algorithm is transmitted.

10. The method of claim 9, wherein the selectively monitoring for and receiving of the software routines for the at least one algorithm further comprises:
    executing at least one interrupt service routine in response to receiving an interrupt signal corresponding to the unmasked interrupt bit;
    receiving the software routines for the at least one algorithm in response to execution of the interrupt service routine; and
    storing the received software routines for the at least one algorithm in a memory used by the one DSP.

11. The method of claim 8, wherein a memory accessed by the one DSP comprises data correlating each of the plurality of algorithms with a serial bus channel on which each of the plurality of algorithms are transmitted.

12. The method of claim 8, wherein the data correlating each of the plurality of algorithms with a serial bus channel on which each of the plurality of algorithms are transmitted is downloaded toward the one DSP from the processor.

13. The method of claim 8, wherein the data correlating each of the plurality of algorithms with a serial bus channel on which each of the plurality of algorithms are transmitted is hard-coded in a service DSP engine that the one DSP is a part of.

14. The method of claim 7, wherein each channel of the channelized serial bus transmits the software routines for at least one of the algorithms.

15. The method of claim 7, wherein the software routines for at least one of the algorithms is transmitted on a channel of the channelized serial bus.

16. The method of claim 7, wherein the software routines for a particular algorithm is transmitted using at least one channel of the channelized serial bus.

17. The method of claim 6, wherein the software routines for the plurality of algorithms is stored in a memory of the master DSP engine.

18. The method of claim 1, wherein the one DSP is part of a service DSP engine that comprises at least one channel.

19. The method of claim 1, wherein the method further comprises storing the software routines for the at least one algorithm into a memory that is accessible to the one DSP and wherein the type of data type is selected from the group consisting of:
    modem;
    audio;
    voice;

video; and, facsimile.

20. The method of claim 19, wherein the software routines for the plurality of algorithms are broadcasted using a plurality of serial blocks, wherein each of the broadcasted serial blocks comprise a portion of the software routines for the plurality of firmware algorithms.

21. The method of claim 20, wherein the broadcast of each of the serial blocks is preceded by a broadcast of an address signal, the address signal identifying the executable instructions for the algorithm of the broadcasted serial block.

22. An apparatus for supporting digital signal processing (DSP) of a plurality of types of data, the apparatus comprising:

a serial bus comprising at least one channel over which a plurality of algorithms embodied as software routines are continuously broadcasted; and, a plurality of service DSP engines communicatively coupled to the serial bus and to at least one data line, at least one of the plurality of service DSP engines designed to selectively monitor for and receive the software routines for at least one algorithm of the plurality of algorithms in response to a determination of a type of data that the at least one service DSP engine is to process, wherein the software routines for the at least one algorithm is used to process data being of the type of data, the at least one service DSP engine to be positioned between a pair of networks, the at least one service DSP engine comprising a DSP and a memory, the DSP capable of executing the software routines for the at least one algorithm.

23. The apparatus of claim 22, further comprising a master DSP engine implemented with a host processor, the master DSP engine coupled to the serial bus, wherein the master DSP engine continuously broadcasts the plurality of algorithms to the plurality of service DSP engines.

24. The apparatus of claim 23, wherein:

at least one pulse coded modulation (PCM) data stream that is received from a public switched telephone network (PSTN) is carried over the at least one data line;

at least one packet of data is generated from the PCM data stream by the at least one service DSP engine using the received software routines for the at least one algorithm; and, the at least one packet of data is transmitted over an Internet Protocol (IP) network, the PSTN network being a first of the networks and the IP network being a second of the networks.

25. The apparatus of claim 22, wherein:

at least one packet of data is received from an IP network;

at least one PCM data stream is generated from the at least one packet of data by the service DSP engine using the software routines for the at least one algorithm; and the at least one PCM data stream is carried over the at least one data line and is transmitted over a PSTN, the PSTN network being a first of the networks and the IP network being a second of the networks.

26. The apparatus of claim 22, wherein the at least one data line comprises at least one bidirectional PCM data stream.

27. The apparatus of claim 22, wherein the at least one data line comprises at least one bidirectional host bus.

28. The apparatus of claim 22, wherein the memory is to store the software routines for the at least one algorithm and the type of data is selected from the group consisting of:

modem;

audio;

voice;

video; and, facsimile.

29. The apparatus of claim 28, wherein the at least one service DSP engine selectively monitors for and receives the executable instructions for the at least one algorithm by determining an address of at least one channel of the serial bus on which the executable instructions for the at least one algorithm is available and by unmasking a bit of an interrupt mask, the unmasked bit corresponding to the address of the at least one channel of the serial bus on which the executable instructions for the at least one algorithm is transmitted.

30. The apparatus of claim 29, wherein the at least one service DSP engine selectively monitors for and receives the software routines for the at least one algorithm by:

executing at least one interrupt service routine in response to receiving an interrupt signal corresponding to the unmasked interrupt bit;

receiving the software routines for the at least one algorithm in response to execution of the interrupt service routine; and storing the received software routines for the at least one algorithm in the memory.

31. The apparatus of claim 28, wherein information correlating each of the plurality of algorithms with a serial bus channel on which each of the plurality of algorithms are transmitted is downloaded to each service DSP engine from a host processor.

32. The apparatus of claim 22, wherein the detected data is received from a public switched telephone network.

33. The apparatus of claim 22, wherein each service DSP engine comprises at least one channel.

34. The apparatus of claim 22, wherein at least one algorithm is transmitted on a channel of the serial bus.

35. The apparatus of claim 22, wherein an algorithm is transmitted using at least one channel of the serial bus.

36. The apparatus of claim 22, wherein each of the plurality of algorithms are broadcasted using a plurality of serial blocks, wherein each of the broadcasted serial blocks comprise a portion of the executable instructions for the plurality of firmware algorithms.

37. A multiservice digital signal processing (DSP) system comprising:

a processor to implement a master DSP engine;

a serial bus coupled to the master DSP engine, the serial bus comprising a plurality of channels over which a plurality of algorithms embodied as software routines are continuously broadcasted by the master DSP engine; and, a plurality of service DSP engines coupled to at least one data line and the serial bus, at least one of the plurality of service DSP engines being tailored to selectively monitor for and receive the software routines for at least one algorithm from the serial bus in response to a determination of a type of data that the at least one DSP service engine is to process, wherein the software for the at least one algorithm is used to process data being of the type of data, the at least one service DSP engine positioned to process the data as it travels between networks, the at least one service DSP engine comprising a DSP and a memory, the DSP capable of executing the software routines for the at least one algorithm.

38. The system of claim 37, wherein:

at least one pulse coded modulation (PCM) data stream transported over the at least one data line is received from a public switched telephone network (PSTN);

at least one packet of data is generated from the PCM data stream by the at least one service DSP engine using the received software routines for the at least one algorithm; and, the at least one packet of data is transmitted over an Internet Protocol (IP) network, the PSTN network a first of the networks, the IP network a second of the networks.

39. The system of claim 37, wherein:

at least one packet of data is received from an IP network;

at least one PCM data stream is generated from the at least one packet of data by the at least one service DSP engine using the software routines for the at least one algorithm; and, the at least one PCM data stream is transmitted over a PSTN, the PSTN network a first of the networks, the IP network a second of the networks.

40. The system of claim 37, wherein the at least one data line comprises at least one bidirectional PCM data stream.

41. The system of claim 37, wherein the at least one data line comprises at least one bidirectional host bus.

42. The system of claim 37, wherein the at least one service DSP engine selectively monitors for and receives the software routines for the at least one algorithm by:

determining an address of at least one channel of the serial bus on which the software routines for the at least one algorithm is available; and, unmasking a bit of an interrupt mask in the at least one service DSP engine, the unmasked bit corresponding to the address of at least one channel of the serial bus on which the software routines for the at least one algorithm is transmitted.

43. The system of claim 42, wherein the at least one service DSP engine selectively monitors for and receives the software routines for the at least one algorithm by:

executing at least one interrupt service routine in response to receiving an interrupt signal corresponding to the unmasked interrupt bit;

receiving the software routines for the at least one algorithm in response to execution of the interrupt service routine; and, storing the received software routines for the at least one algorithm in the memory.

44. The system of claim 42, wherein data correlating each of the plurality of algorithms with a serial bus channel on which each of the plurality of algorithms are transmitted is downloaded to each service DSP engine from the processor.

45. The system of claim 37, wherein each of the service DSP engines comprises at least one channel.

46. The system of claim 37, wherein at least one algorithm is transmitted on a channel of the serial bus.

47. The system of claim 37, wherein an algorithm is transmitted using at least one channel of the serial bus.

48. The system of claim 37, wherein the memory is to store the software routines for the at least one algorithm and the type of data is selected from the group consisting of:

modem;

audio;

voice;

video; and, facsimile.

49. A computer readable medium containing executable instructions which, when executed by a digital signal processor (DSP), cause the DSP to perform a method, the method comprising:

selectively monitoring for and receiving a software routine for an algorithm from amongst a plurality of continuously broadcasted software routines for a plurality of algorithms, the selectively monitoring for and receiving being in response to a determination of a type of data that the DSP is to process; and, processing data having the determined type with software routine as the data travels between a telephony network and a data network, wherein the processing further comprises generating at least one packet of data from a PCM data stream, the PCM data stream having been received from the telephony network.

50. The computer readable medium of claim 49 wherein the telephony network is a PSTN network.

51. The computer readable medium of claim 49 wherein the determined type of data is audio data.

52. The computer readable medium of claim 49 wherein the type of data is selected from the group consisting of:

modem;

audio;

voice;

video; and, facsimile.

53. The computer readable medium of claim 52 wherein the selectively monitoring for and receiving the software routine further comprises determining an address of a broadcast channel where the software routine is available and further comprises unmasking a bit of an interrupt mask, the unmasked bit corresponding to the address.

54. The computer readable medium of claim 53 wherein the selectively monitoring for and receiving the software routine further comprises:

executing at least one interrupt service routine in response to receiving an interrupt signal corresponding to the unmasked interrupt bit;

receiving the software routine in response to execution of the interrupt service routine; and storing the received software routine in a memory.

55. The computer readable medium of claim 49 wherein the determined type of data is voice data.

56. The computer readable medium of claim 49 wherein the determined type of data is facsimile data.

57. The computer readable medium of claim 49 wherein the determined type of data is modem data.

58. The computer readable medium of claim 49 wherein the processing further comprises echo cancellation.

59. The computer readable medium of claim 49 wherein the processing further comprises voice coding.

60. The computer readable medium of claim 49 wherein the processing further comprises suppression of packet bandwidth utilization during voice silence.

61. The computer readable medium of claim 49 wherein the processing further comprises modem relay.

62. The computer readable medium of claim 49 wherein the processing further comprises facsimile relay.

63. A method, comprising:

determining a type of data that a DSP is to process while broadcasting a plurality of software routines that the DSP is capable of executing;

selectively monitoring for and receiving at least one software routine from amongst the plurality of continuously broadcasted software routines; and, processing data of the determined type with the at least one software routine in order to help transport the data from a first network to a second network, wherein the processing further comprises generating a PCM data stream from at least one packet of data, the first network being a data network, the second network being a telephony network.

64. The method of claim 63 further comprising transmitting the data into a PSTN network, the PSTN network being the second network.

65. The method of claim 63 wherein the determined type of data is audio data.

66. The method of claim 63 wherein the type of data is selected from the group consisting of:
modem;
audio;
voice;
video; and,
facsimile.

67. The method of claim 66 wherein the selectively monitoring for and receiving the at least one software routine further comprises determining an address of a broadcast channel where the at least one software routine is available and further comprises unmasking a bit of an interrupt mask, the unmasked bit corresponding to the address.

68. The method of claim 67 wherein the selectively monitoring for and receiving the at least one software routine further comprises:
executing at least one interrupt service routine in response to receiving an interrupt signal corresponding to the unmasked interrupt bit;
receiving the at least one software routine in response to execution of the interrupt service routine; and
storing the received at least one software routine in a memory.

69. The method of claim 63 wherein the determined type of data is voice data.

70. The method of claim 63 wherein the determined type of data is facsimile data.

71. The method of claim 63 wherein the determined type of data is modem data.

72. The method of claim 63 wherein the processing further comprises echo cancellation.

73. The method of claim 63 wherein the processing further comprises voice coding.

74. The method of claim 63 wherein the processing further comprises modem relay.

75. The method of claim 63 wherein the processing further comprises facsimile relay.

76. An apparatus for supporting digital signal processing (DSP), the apparatus comprising:
first means for continuously broadcasting a plurality of software routines representative of a plurality of algorithms that can be executed by a DSP; and,
second means for:
1) determining a type of data to be processed, the determining occurring while the plurality of firmware algorithms are being broadcasted
2) identifying, based upon the determining, at least one software routine from the plurality of software routines;
3) selectively monitoring for and receiving the at least one software routine from the plurality of software routines and
4) processing data having the determined type of data with the at least one software routine.

77. The apparatus of claim 76, further comprising:
means for receiving at least one pulse coded modulation (PCM) data stream from a public switched telephone network (PSTN);
the processing means of the second means further including means for generating at least one packet of data from the PCM data stream using the received at least one software routine; and
means for transmitting the at least one packet of data over an Internet Protocol (IP) network.

78. The apparatus of claim 76, further comprising:
means for receiving at least one packet of data from an IP network;
the processing means of the second means further including for generating at least one PCM data stream from the at least one packet of data using the received at least one software routine; and
means for transmitting the at least one PCM data stream over a PSTN.

79. The apparatus of claim 76 wherein the means for selectively monitoring for and receiving at least one software routine further comprises:
means for storing the at least one software routine; and,
wherein the type of data is selected from the group consisting of:
modem;
audio;
voice;
video; and,
facsimile.

80. The method of claim 79, wherein the means for selectively monitoring for and receiving at least one software routine further comprises means for determining an address of at least one broadcast channel where the at least one software routine is available and means for unmasking a bit of an interrupt mask, the unmasked bit corresponding to the address.

81. The method of claim 80, wherein the means for selectively monitoring for and receiving at least one software routine further comprises:
means for executing at least one interrupt service routine in response to receiving an interrupt signal corresponding to the unmasked interrupt bit;
means for receiving the at least one software routine in response to execution of the interrupt service routine; and,
means for storing the received at least one software routine.

82. A method, comprising:
determining a type of data to be processed by a slave Digital Signal Processing (DSP) while broadcasting from a master DSP a plurality of software routines, that can be executed by the slave DSP, toward the slave DSP,
selecting a software routine from amongst the plurality of broadcasted software routines in response to the determining; and,
processing data by executing the software routine upon the slave DSP, the data being of the type of data, the data in transition between networks, wherein the processing further comprises generating at least one packet of data from a PCM data stream, the data in transition from a telephony network to a data network.

83. The method of claim 82 wherein the telephony network is a PSTN network.

84. The method of claim 82 wherein the data further comprises voice or audio data.

85. The method of claim 82 wherein the selecting further comprises:
determining where the software routine resides amongst the continuously broadcasted software routines
storing the selected software routing into a memory.

86. The method of claim 82 wherein the data further comprises video data.

87. The method of claim 82 wherein the data further comprises facsimile data.

88. The method of claim 82 wherein the data further comprises modem data.

89. The method of claim 82 wherein the processing further comprises echo cancellation.

90. The method of claim 82 wherein the processing further comprises voice coding.

91. The method of claim 82 wherein the processing further comprises suppression of packet bandwidth utilization during voice silence.

92. The method of claim 82 wherein the processing further comprises modem relay.

93. The method of claim 82 wherein the processing further comprises facsimile relay.

94. The method of claim 82 further comprising detecting a change in the type of data that the slave DSP is to process.

95. The method of claim 94 further comprising selecting a new software routine from the plurality of broadcasted software routines in response to the detecting a change.

96. The method of claim 95 further comprising replacing the software routine with the new software routine in a memory that is accessible to the slave DSP.

97. The method of claim 96 further comprising processing data having the new type of data by executing the new software routine with the slave DSP.

98. The method of claim 82 wherein a first of the networks is a telephony network and a second of the networks is a data network.

99. The method of claim 98 wherein the data network is an IP network.

100. The method of claim 98 wherein the telephony network is an PSTN network.

101. The method of claim 100 wherein the data network is an IP network.

102. The method of claim 82 wherein one of the networks is a telephony network.

103. The method of claim 102 wherein the telephony network is a PSTN network.

104. The method of claim 82 wherein one of the networks is a data network.

105. The method of claim 104 wherein the data network is an IP network.

106. An apparatus, comprising:
 a) a processor to implement a master DSP engine that continuously broadcasts a plurality of software routines;
 b) a plurality of service DSP engines, each of said service DSP engines having its own Digital Signal Processor (DSP) and memory; and,
 c) a bus to transport said plurality of software routines toward said plurality of service DSP engines, said memory of each service DSP engine capable of storing a particular software routine selected from said broadcasted plurality of software routines as a consequence of said memory's corresponding service DSP engine having determined the particular software routine in response to determining a type of data that its constituent DSP is to process, the type of data being selected from the group consisting of:
 modem;
 audio;
 voice;
 video; and.
 facsimile.

107. The apparatus of claim 106 further comprising a PCM stream line coupled to a plurality of said service DSP engines.

108. The apparatus of claim 106 wherein said bus is a channelized serial bus.

109. The apparatus of claim 106 wherein said service DSP engine further comprises a serial port to receive said particular software routine.

110. The apparatus of claim 109 wherein said serial port is a TDM serial port.

111. The apparatus of claim 106 wherein said processor is a host CPU.

112. The apparatus of claim 106 further comprising a second memory that is accessible to said processor, said memory to store said plurality of software routines.

113. The apparatus of claim 112 wherein said plurality of software routines further comprise an echo cancellation software routine.

114. The apparatus of claim 112 wherein said plurality of software routines further comprise a voice coding software routine.

115. The apparatus of claim 114 wherein said voice coding software routine is a parametric voice coding software routine.

116. The apparatus of claim 114 wherein said voice coding software routine is a non-parametric voice coding software routine.

117. The apparatus of claim 112 wherein said plurality of software routines further comprise a suppression of packet bandwidth utilization during voice silence software routine.

118. The apparatus of claim 112 wherein said plurality of software routines further comprise facsimile relay software routine.

119. The apparatus of claim 112 wherein said plurality of software routines further comprises a modem relay software routine.

120. The apparatus of claim 106 wherein each service DSP engine is positioned to process data as the data travels between networks.

121. An apparatus comprising:
 a service DSP engine comprising a DSP and a memory, said service DSP engine to process data as it travels between networks, said service DSP engine to determine a particular software routine from a plurality of continuously broadcasted software routines based upon said data's type, said memory to store said particular software routine, said DSP to execute said particular software routine and to generate at least one packet of data from a PCM data stream, a first of said networks being a telephony network, a second of said networks being a data network.

122. The apparatus of claim 121 wherein said plurality of software routines further comprise an echo cancellation software routine.

123. The apparatus of claim 121 wherein said plurality of software routines further comprise a voice coding software routine.

124. The apparatus of claim 123 wherein said voice coding software routine is a parametric voice coding software routine.

125. The apparatus of claim 123 wherein said voice coding software routine is a non-parametric voice coding software routine.

126. The apparatus of claim 121 wherein said plurality of software routines further comprise a suppression of packet bandwidth utilization during voice silence firmware routine.

127. The apparatus of claim 121 wherein said plurality of software routines further comprise facsimile relay software routine.

128. The apparatus of claim 121 wherein said plurality of software routines further comprises a modem relay software routine.

129. The apparatus of claim 121 wherein said data's s a type selected from the group consisting of:

modem;

audio;

voice;

video; and, facsimile.

130. The apparatus of claim 129 wherein said data network is an IP network.

* * * * *